(12) United States Patent
Bowman et al.

(10) Patent No.: US 10,017,010 B2
(45) Date of Patent: Jul. 10, 2018

(54) FLUID RESERVOIR WITHIN A TIRE

(71) Applicant: DEERE & COMPANY, Moline, IL (US)

(72) Inventors: Dennis Bowman, Denver, IA (US); Jonathan T. Roth, Hanford, CA (US)

(73) Assignee: DEERE & COMPANY, Moline, IL (US)

( * ) Notice: Subject to any disclaimer, the term of this patent is extended or adjusted under 35 U.S.C. 154(b) by 237 days.

(21) Appl. No.: 14/824,665

(22) Filed: Aug. 12, 2015

(65) Prior Publication Data
US 2017/0043623 A1    Feb. 16, 2017

(51) Int. Cl.
| | |
|---|---|
| *B60C 5/22* | (2006.01) |
| *B60C 23/00* | (2006.01) |
| *B60C 29/00* | (2006.01) |
| *B62D 49/00* | (2006.01) |
| *B60C 23/12* | (2006.01) |
| *B60B 25/12* | (2006.01) |
| *B60B 25/22* | (2006.01) |

(52) U.S. Cl.
CPC .............. *B60C 5/22* (2013.01); *B60C 23/004* (2013.01); *B60C 29/007* (2013.01); *B60B 25/12* (2013.01); *B60B 25/22* (2013.01); *B60C 23/12* (2013.01); *B62D 49/00* (2013.01)

(58) Field of Classification Search
CPC ........... B60C 5/22; B60C 17/01; B60C 23/00; B60C 23/001; B60C 23/12; B60C 29/007; B60C 23/004
See application file for complete search history.

(56) References Cited

U.S. PATENT DOCUMENTS

| 2,554,815 A | 5/1951 | Church |
| 2,731,062 A | 1/1956 | Coben |
| 2,898,969 A * | 8/1959 | Pfeiffer .................... B60O 5/22 |
| | | 152/341.1 |

(Continued)

FOREIGN PATENT DOCUMENTS

| DE | 7618034 U1 | 6/1977 |
| DE | 4010711 C2 | 6/1993 |

(Continued)

OTHER PUBLICATIONS

Extended European Search Report, dated Jan. 24, 2017, by European Patent Office.

*Primary Examiner* — Kip T Kotter
(74) *Attorney, Agent, or Firm* — Taft Stettinius & Hollister LLP; Stephen F. Rost

(57) ABSTRACT

A wheel assembly has a rim with an outer radial surface. A tire coupled to the rim defines a first interior region between the outer radial surface and the tire. A bladder coupled to the rim defines a second interior region between the outer radial surface and the bladder. A third interior region is defined between the bladder and the tire. The wheel assembly includes a valve fluidly coupled to the second interior region and the third interior region. The valve is movable between a first position and a second position. The second interior region and the third interior region are fluidly isolated from one another when the valve is in the first position. The second interior region and the third interior region may be fluidly coupled to one another when the valve is in the second position.

10 Claims, 8 Drawing Sheets

(56) References Cited

U.S. PATENT DOCUMENTS

| | | | |
|---|---|---|---|
| 2,905,221 A * | 9/1959 | Nonnamaker | B60C 29/007 |
| | | | 137/510 |
| 5,180,456 A | 1/1993 | Schultz et al. | |
| 5,301,729 A * | 4/1994 | Blair | B60O 5/22 |
| | | | 152/342.1 |
| 5,535,061 A | 7/1996 | Blair | |
| 5,538,061 A * | 7/1996 | Blair | B60O 5/22 |
| | | | 152/342.1 |
| 5,647,927 A | 7/1997 | Mason | |
| 5,995,895 A | 11/1999 | Watt et al. | |
| 6,098,682 A | 8/2000 | Kis | |
| 6,144,295 A | 11/2000 | Adams et al. | |
| 6,212,464 B1 | 4/2001 | Skotnikov | |
| 6,236,923 B1 | 5/2001 | Corcoran et al. | |
| 6,763,288 B2 | 7/2004 | Caretta et al. | |
| 6,779,618 B2 | 8/2004 | Tarasinski | |
| 7,021,720 B1 | 4/2006 | Yeggy | |
| 7,219,540 B2 | 5/2007 | Nordhoff | |
| 7,277,784 B2 | 10/2007 | Weiss | |
| 7,302,837 B2 | 12/2007 | Wendte | |
| 8,494,727 B2 | 7/2013 | Green et al. | |
| 8,843,269 B2 | 9/2014 | Anderson et al. | |
| 9,078,391 B2 | 7/2015 | Pichlmaier | |
| 9,248,705 B2 | 2/2016 | Brenninger et al. | |
| 2009/0020201 A1* | 1/2009 | Ohara | B60O 5/22 |
| | | | 152/340.1 |
| 2013/0046418 A1 | 2/2013 | Anderson | |
| 2013/0046446 A1 | 2/2013 | Anderson | |
| 2013/0054078 A1 | 2/2013 | Anderson | |
| 2013/0180641 A1 | 7/2013 | French | |
| 2016/0332486 A1* | 11/2016 | Strashny | B60C 17/01 |

FOREIGN PATENT DOCUMENTS

| | | |
|---|---|---|
| EP | 1017574 B1 | 9/2002 |
| EP | 1051302 | 7/2003 |
| JP | 58-149806 A | 6/1983 |
| WO | 2010046905 A1 | 4/2010 |
| WO | 2011033015 A1 | 3/2011 |
| WO | 2012084690 A1 | 6/2012 |
| WO | 2012084912 A1 | 6/2012 |
| WO | 2016089593 A1 | 9/2016 |

* cited by examiner

FLUID RESERVOIR WITHIN A TIRE

FIELD OF THE DISCLOSURE

The present disclosure relates to a tractor or other work machine, and in particular, to a wheel assembly or plurality of wheel assemblies for use with the tractor or other work machine.

BACKGROUND OF THE DISCLOSURE

Wheel assemblies incorporating large tires are frequently used in agricultural tractors and similar vehicles or other work machines. Many wheel assemblies incorporate tires that define a large volume of fluid in a cavity defined between the tire and a rim of the wheel assembly. While tires vary in application and accordingly define different cavity sizes, some tires may have a cavity with a fluid volume of about 150-1000 liters. The pressure of fluid disposed in this space is commonly referred to as the tire pressure.

Agricultural tractors and work machines frequently travel on different types of terrain for different reasons. When an operator of a tractor or work machine is operating the tractor or work machine on a field or other relatively soft terrain, the operator may desire a low tire pressure in order to reduce the impact each tire has on the underlying terrain or increase the traction of the tire. However, when the operator is transporting the tractor or work machine, the operator may control the tractor or work machine at higher speeds and on harder terrain such as a gravel or asphalt road. When travelling along harder terrain, the operator may desire a higher tire pressure to allow the tractor or work machine to be efficiently controlled while traveling at higher speeds.

Similarly, the load conditions of the tractor or work machine frequently change during use. It is common for an operator to utilize the tractor or work machine with little or no additional load, and then later add an implement or other load. When a load is added to the tractor or work machine, the operator may need to increase the tire pressure in order to properly address the new load conditions.

SUMMARY

The present disclosure relates to a wheel assembly having a rim with an outer radial surface wherein a tire may be coupled to the rim to define a first interior region between the outer radial surface and the tire. A bladder may also be coupled to the rim to define a second interior region between the outer radial surface and the bladder. A third interior region may be defined between the bladder and the tire and a valve may be fluidly coupled to the second interior region and the third interior region, the valve being movable between a first position and a second position. The bladder may be disposed in the first interior region. Further, the second interior region and the third interior region are fluidly isolated from one another when the valve is in the first position. The second interior region and the third interior region may be fluidly coupled to one another when the valve is in the second position.

In one embodiment of the present disclosure a tractor may have a chassis, a controller, a sensor adapted to measure fluid pressure and being in electrical communication with the controller, and at least one wheel assembly coupled to the chassis. The wheel assembly may have a rim with an outer radial surface, a tire coupled to the rim to define a first interior region between the outer radial surface of the rim and the tire, a bladder disposed in the first interior region and coupled to the rim to define a second interior region between the outer radial surface of the rim and the bladder, a third interior region defined between the bladder, the radially outer surface, and the tire, and a valve fluidly coupled to both the second interior region and the third interior region, the valve being operably controllable by the controller to move between a first position and a second position. The second interior region and the third interior region may be fluidly isolated from one another when the valve is in the first position, and the second interior region and the third interior region may be fluidly coupled to one another when the valve is in the second position.

The present disclosure may also involve a method of manufacturing a wheel assembly for a tractor. The method may include providing a rim, a tire, a bladder, a valve, a controller, and a sensor, positioning the bladder at least partially within a cavity created by the tire, coupling the tire and the bladder to the rim, the tire being coupled to the rim to define a first interior region between the cavity of the tire and the rim, the bladder being coupled to the rim to define a second interior region within the first interior region. Further, a third interior region may be defined between the bladder, the tire, and the rim. The method of manufacturing may include positioning the valve to selectively fluidly couple the second interior region to the third interior region, electronically coupling the valve to the controller, electronically coupling the sensor to the controller, and communicating, with the sensor, a pressure condition of the third interior region to the controller.

In yet another embodiment, a wheel assembly for a tractor has a tire having an inner diameter and an outer diameter, the tire adapted to rotate about an axis. The wheel assembly also includes a rim having an outer radial surface, where the tire is coupled to the rim to define a first internal cavity therebetween. A bladder may be disposed in the first internal cavity and be coupled to the rim along the outer radial surface, where a second internal cavity is defined between the rim and the bladder, and a third internal cavity is defined between the tire and the bladder. A rim member may also be removably coupled to the rim, the rim member forming a second outer radial surface to which the inner diameter of the tire is in contact with. A valve may be fluidly coupled to the second and third internal cavities, the valve being movable between a first position where the second and third internal cavities are fluidly isolated from one another and a second position where the second and third internal cavities are fluidly coupled to one another.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
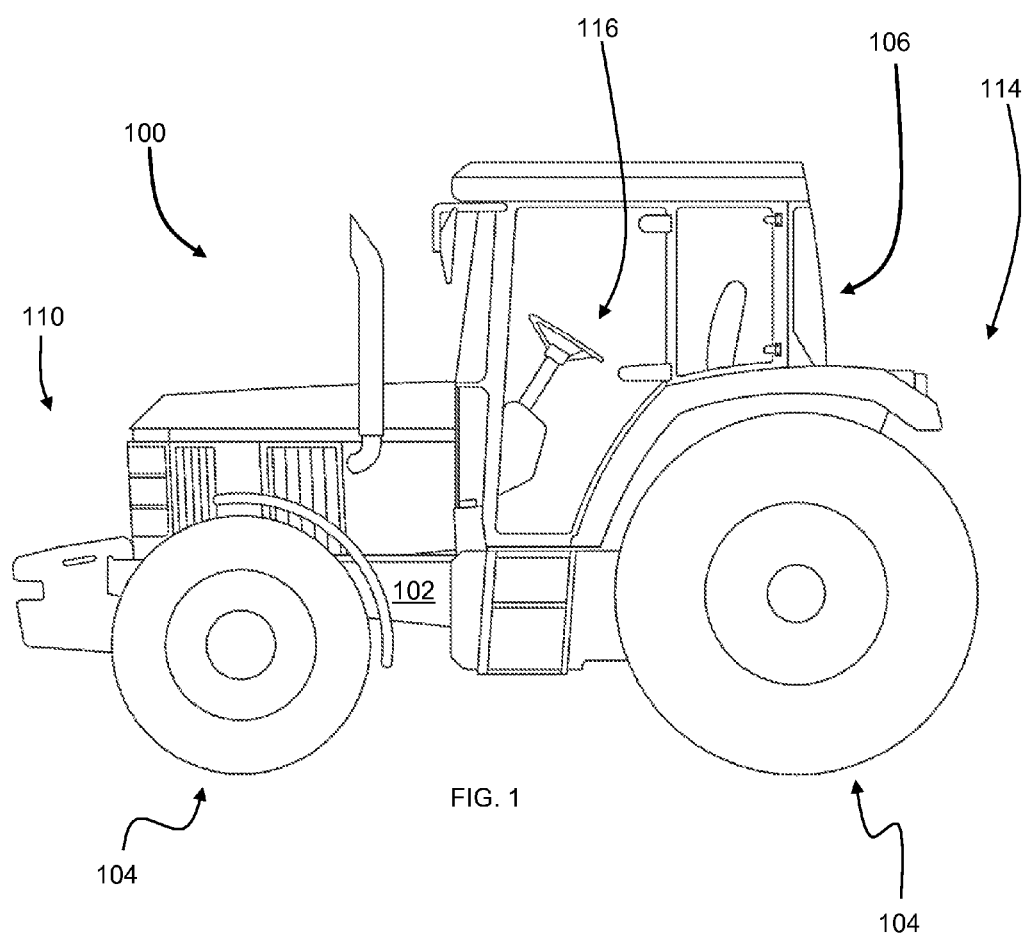
FIG. 1 is a side view of a conventional tractor.

Referring to FIG. 1, a conventional tractor 100 is shown. While a conventional tractor is shown, this disclosure is not limited to such a machine. Rather, the teaching of this disclosure may be applicable to any wheel assembly of any type of vehicle, work machine or tractor.

The tractor 100 may have a chassis 102 coupled to at least one wheel assembly 104. The tractor 100 in the embodiment of FIG. 1 shows one wheel assembly 104 coupled to the chassis 102 at a front end 110 and another wheel assembly 104 coupled to the chassis at a back end 114. In addition to the wheel assemblies 104, the chassis 102 may also have a cabin 106 coupled thereto. The cabin 106 may provide a location for a user to control a plurality of components through a control panel 116 that may be coupled to the chassis 102. The control panel 116 may have, among other things, a plurality of inputs that the user may engage to control the electrical, hydraulic, and/or mechanical components of the tractor 100. In one non-limiting example, a drive mechanism (not shown) may also be coupled to the chassis 102. Further, the user may selectively engage the work machine to provide torque to the wheel assembly 104. As torque is transferred to the wheel assembly 104, the wheel assembly 104 may rotate against an underlying surface to provide motion to the tractor 100.

Changing or modifying the tire pressure is conventionally achieved either through compressors or other pump assemblies that force fluid into the cavity of the tire/wheel assembly to increase the tire pressure. Utilizing standard compressors to fill the large-volume cavities can require a substantial amount of time to achieve a minimal increase in tire pressure. In order to more quickly increase the tire pressure, larger compressors may be used. However, these larger, conventional compressors are often too large to be locally mounted to the tractor or work machine.

The teachings of this disclosure relate to compressing or otherwise positioning fluid within a chamber. Fluid can mean any type of gas or liquid and the term "fluid" should not be limited to meaning exclusively a gas or a liquid. In one embodiment, the surrounding atmosphere may be the fluid placed within the chamber. In a different embodiment, the fluid may be substantially nitrogen gas. In yet a different embodiment, the fluid may be partially a liquid and partially a gas. There are many forms of fluid that are applicable to the present disclosure; accordingly, the disclosure should not be limited to any one specific type of fluid.

An apparatus is provided herein, and in particular, a compact system including a wheel assembly that increases the tire pressure of a tire relatively quickly.

Figure 2:
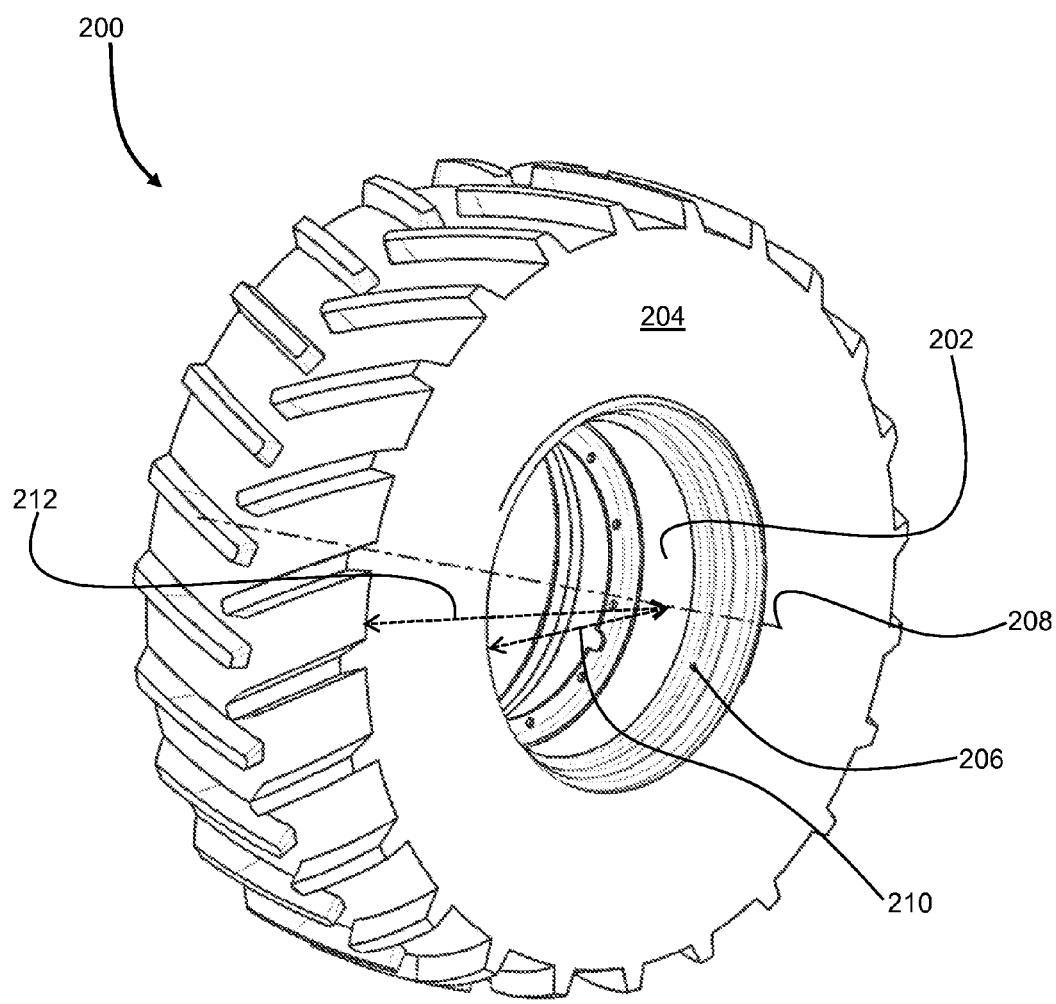
FIG. 2 is a perspective view of a wheel assembly.

Referring now to FIG. 2, an isolated perspective view 200 of the wheel assembly 104 is shown. More particularly, a rim 202 is shown coupled to a tire 204. In this embodiment, the rim 202 may be coupled to a drive system (not shown) of the tractor 100 to selectively engage the underlying surface through the tire 204. A valve 206 is also shown in FIG. 2 of the wheel assembly 104. In one embodiment, the valve 206 may provide for a location to transfer a fluid from an area outside the rim 202 to an area between the rim 202 and the tire 204. As will become more apparent throughout this disclosure, the particular location of the valve 206 is not limiting. In a different embodiment, there may not be a valve 206 located along the rim. In other aspects, there may be two or more valves for a given wheel assembly.

The rim 202 and tire 204 may form an annular body concentrically disposed about a rotation axis 208. The rotation axis 208 may be aligned with an axle (not shown) of the tractor 100. The axle may provide torque to the rim 202 along the rotation axis 208 to allow the tractor 100 to move along the underlying surface. In one embodiment, the tire 204 may have a tire inner radius 210 and a tire outer radius 212. The actual dimensions of the tire inner radius 210 and the tire outer radius 212 may vary depending on the particular needs of the tractor 100. In one embodiment, the tire inner radius 210 may be 450 millimeters and the tire outer radius 212 may be 1065 millimeters, but this disclosure is not limited to any particular dimension or size or shape of tire. Further, in one non-exclusive example, a cavity disposed between the tire 204 and the rim 202 may have a volume of about 700-1100 liters. However, this disclosure is not limited to any particular volume of tire.

Figure 3:
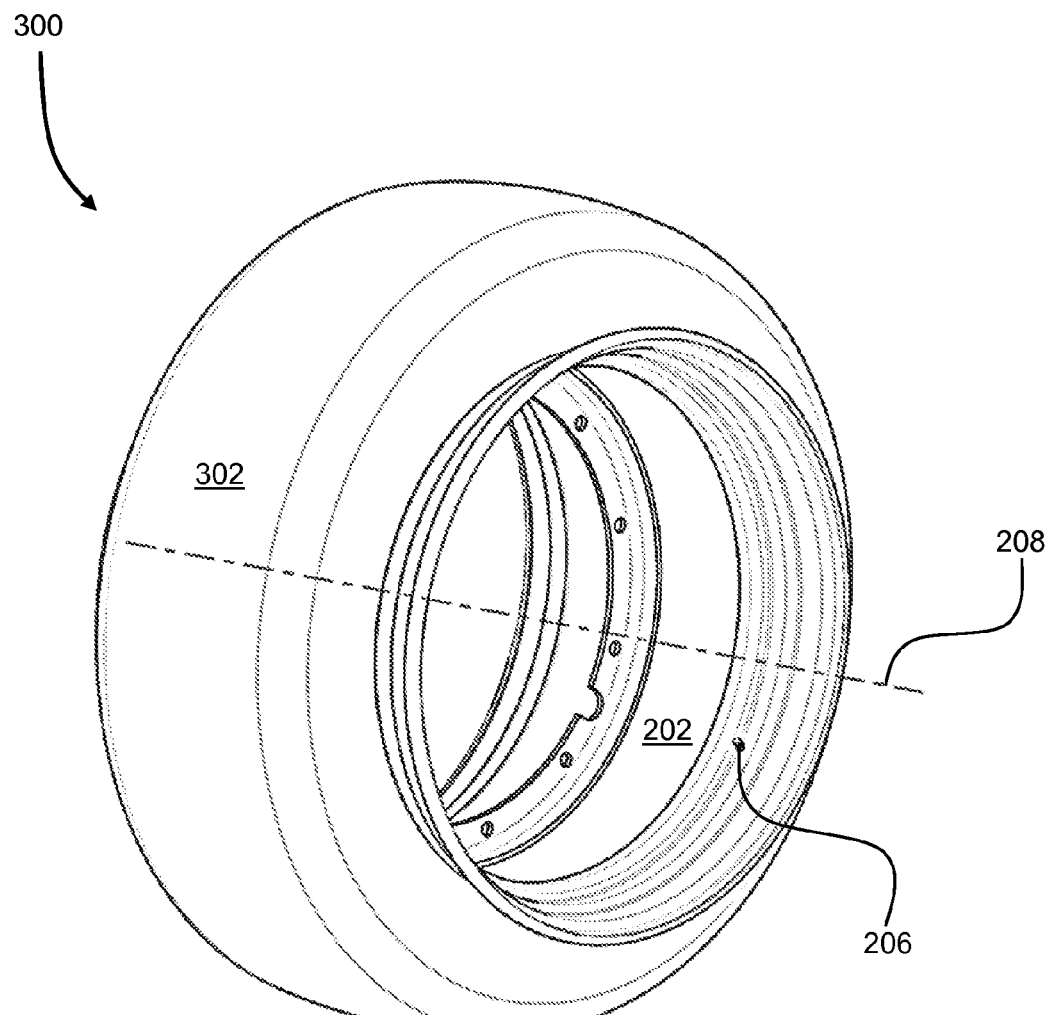
FIG. 3 is a perspective view of the wheel assembly of FIG. 2 with a tire removed.

Referring now to FIG. 3, a perspective view 300 of the wheel assembly 104 with the tire 204 removed is shown. More specifically, a bladder 302 is shown that may be positioned along an outer diameter of the rim 202 and within the tire 204 (not shown in FIG. 3). The bladder 302 may be sized to fit within the cavity defined between the tire 204 and the rim 202. The bladder 302 may be pressurized with a desired fluid or otherwise contain a volume of fluid.

Figure 4:
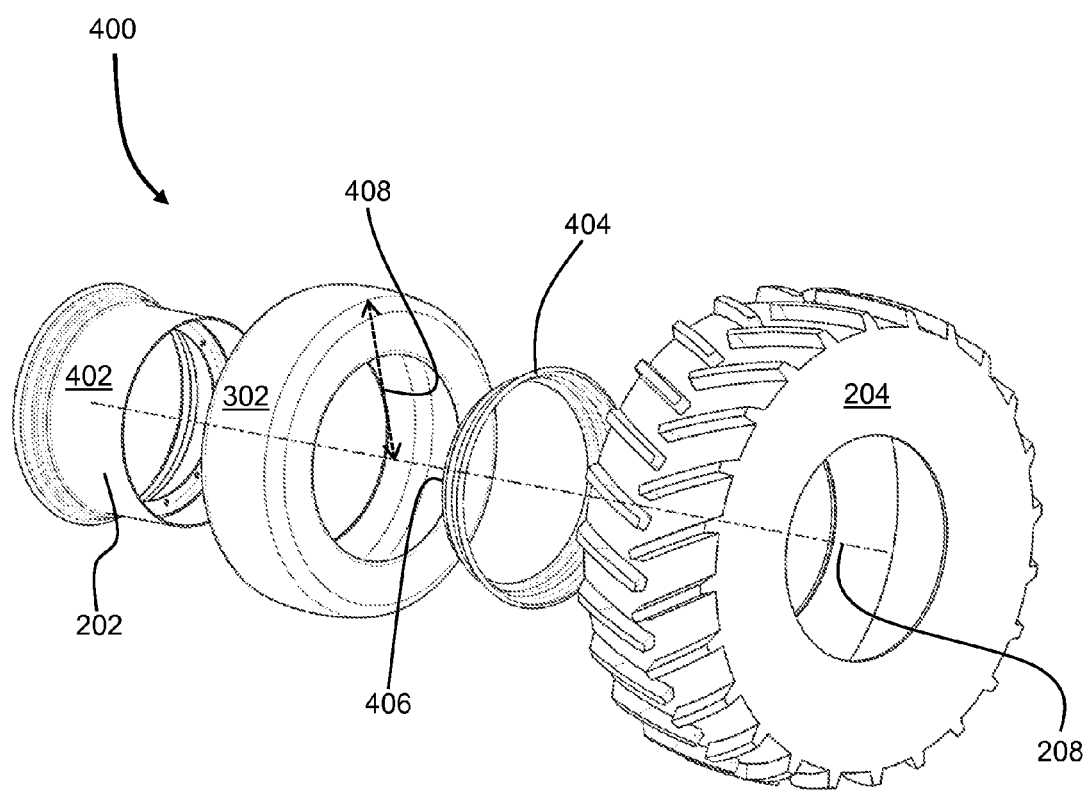
FIG. 4 is an exploded perspective view of the wheel assembly of FIG. 3.

In FIG. 4, an exploded view 400 of the wheel assembly 104 is shown without the tire 204. The exploded view 400 more clearly shows a first outer radial surface 402 defined in part by the rim 202. The first outer radial surface 402 may be a substantially impermeable cylindrical surface disposed about the rotation axis 208. When the bladder 302 or tire 204 or both are coupled to the rim 202, at least one substantially fluid-tight cavity may be created therebetween. In one non-exclusive embodiment, when the bladder 302 or tire 204 or both are coupled to the rim 202, the passage of fluid from an area outside of the at least one cavity to an area within the at least one cavity may be operably controlled by the valve 206. In some aspects, there may be two or more valves 206 such that each can operably control fluid flow.

A rim member 404 is also shown in FIG. 4. The rim member 404 may have an internal radius that is sized to be received by a portion of the rim 202. That is to say, the rim member 404 may at least partially slide over, or be press-fit into, a portion of the first outer radial surface 402. In one embodiment, the rim member 404 may be removably coupled to the rim 202 and provide a second outer radial surface 406, as shown in FIG. 4. In this embodiment, when the rim member 404 is coupled to the rim 202, the tire 204 and/or bladder 302 may be coupled to both the rim 202 and the rim member 404 to define at least one fluid-tight cavity therebetween. In an alternative embodiment, the rim member 404 described above may not be a separate piece, but rather the second radial surface 406 may be defined as part of the rim 202 itself rather than requiring the separate rim member 404.

In one embodiment, the tire 204 may be composed of a rubber or other substantially similar material. The material may be sufficiently strong to withstand the pressure and driving conditions expected for any number of a plurality of applications. Further, the material of the tire 204 may deflect or compress as the tractor 100 or other work machine is exposed to different loads, road conditions, or road surfaces.

The bladder 302 may also define a bladder outer radius 408. In one embodiment, the bladder outer radius 408 may be sized to be less than the tire outer radius 212. In this embodiment, the bladder outer radius 408 may be sufficient sized to allow the tire 204 to deflect towards the rotation axis 208 during rotation thereof without contacting the bladder 302. In one non-exclusive embodiment, the bladder outer radius 408 is approximately 65% to 85% the tire outer radius 212. Other ranges may be possible in different embodiments.

In a further embodiment, the bladder 302 may contact the tire 204 under certain conditions. More specifically, the bladder 302 may act as a supplementary or back-up cushion or support if the tire 204 deflects beyond a certain location. In yet another embodiment, the bladder 302 may have a bladder outer radius 408 that is large enough to allow the tractor 100 to travel along the underlying surface even when the tire 204 is insufficiently inflated.

Figure 5:
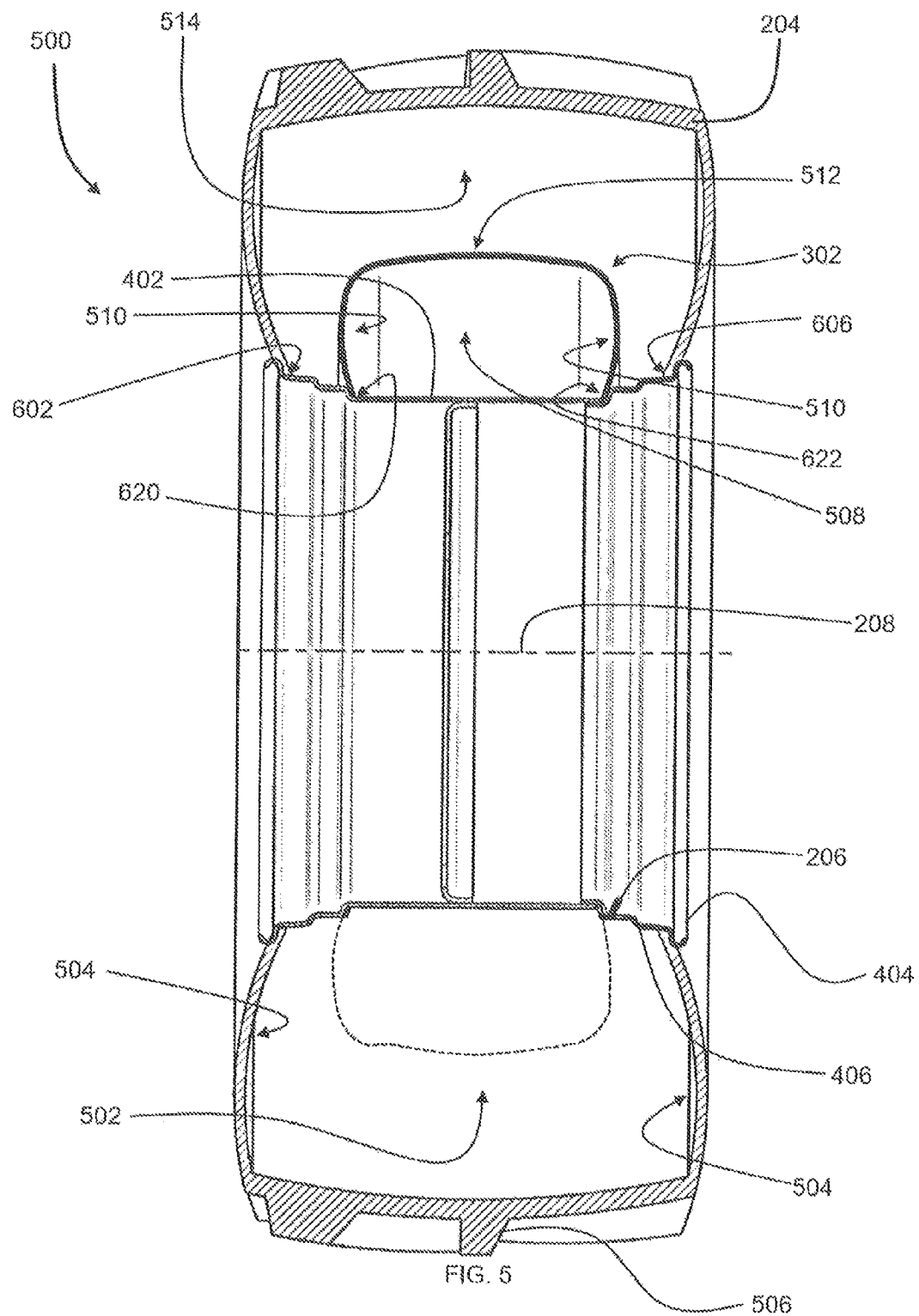
FIG. 5 is a partial cross-sectional view of the wheel assembly from FIG. 2.

A sectional view 500 of the wheel assembly 104 is shown in FIG. 5. In FIG. 5, the lower portion of the bladder 302 is shown with broken lines to more clearly illustrate a first interior region 502. More specifically, the first interior region 502 is illustrated in FIG. 5. The first interior region 502 may be a substantially toroidal cavity defined between the tire 204, the rim 202, and the rim member 404. The radially inner portion of the first interior region 502 may be defined by the first outer radial surface 402 of the rim 202 and the second outer radial surface 406 of the rim member 404. Interior tire walls 504 may define two sides of the first interior region 502 as the tire walls 504 extend radially away from the rim 202. Along the tire outer radius 212, the tire walls 504 may terminate at a tire tread 506 that connects each of the two tire walls 504 to one another. The first interior region 502 may create a toroidal cavity between the first outer radial surface 402, the second outer radial surface 406, the tire walls 504, and the tire tread 506.

Similarly, the bladder 302 may be coupled to the rim 202 to define a second interior region 508. The second interior region 508 may also be a substantially toroidal cavity defined between the bladder 302, the rim 202, and the rim member 404. The radially inner portion of the second interior region 508 may be defined by the first outer radial surface 402 of the rim 202 and the second outer radial surface 406 of the rim member 404. Bladder walls 510 may define two sides of the second interior region 508 as the bladder walls 510 extend radially away from the rim 202. Along the bladder outer radius 408, the bladder walls 510 may terminate at a bladder surface 512 that connects each of the two bladder walls 510 to one another. The second interior region 508 may create a toroidal cavity between the first outer radial surface 402, the second outer radial surface 406, the bladder walls 510, and the bladder surface 512.

A third interior region 514 may also be defined by the rim 202, the rim member 404, the bladder 302, and the tire 204. In one non-limiting example, the third interior region 514 may be defined by the portion of the first outer radial surface 402 between the bladder 302 and the tire 204, the portion of the second outer radial surface 406 between the bladder 302 and the tire 204, the tire walls 504, the tire tread 506, the bladder surface 512 and the bladder walls 510. More simply put, the third interior region 514 is substantially the space between the bladder 302 and the tire 204 when both the bladder 302 and the tire 204 are coupled to the rim 202.

The first, second, and third interior regions 502, 508, and 514 have been described above with relation to the rim 202 and the rim member 404. In another embodiment, however, there may be no rim member 404. In this embodiment, the second outer radial surface 406 described above for the rim member 404 may be defined by a portion of the rim 202. That is to say, instead of the rim member 404 being a removable component, the structural elements of the rim member shown and described above may be formed by the rim 202 as one integrally formed outer radial surface.

Figure 6:
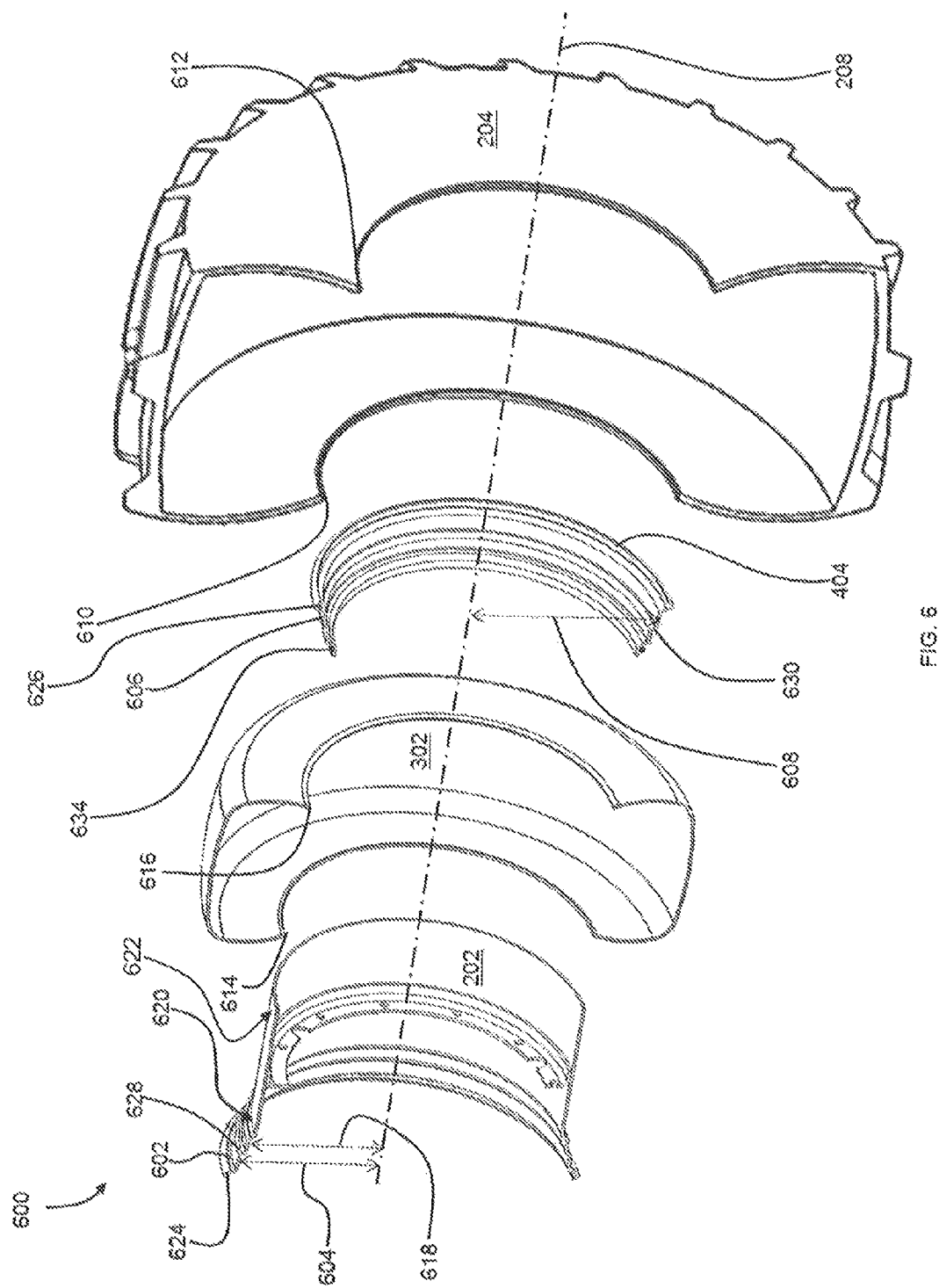
FIG. 6 is a partial exploded view of the wheel assembly of FIG. 5.

Referring now to FIG. 6, an exploded section view 600 is shown. In the exploded section view 600, a first bead seat 602 is more clearly shown. The first bead seat 602 may be a cylindrically-defined surface on the rim 202. The first bead seat 602 may be concentric with the rotation axis 208 and spaced a first radial distance 604 from the rotation axis 208.

Similarly, the rim member 404 may define a second bead seat 606. The second bead seat 606 may be a cylindrically-defined defined on the rim member 404. The second bead seat 606 may be concentric with the rotation axis 208 and spaced a second radial distance 608 from the rotation axis 208. In one non-limiting example, the second radial distance 608 may be the same as the first radial distance 604. This, however, may differ in other examples.

The tire 204 may have a first tire bead 610 and a second tire bead 612 that may be coupled to or disposed in contact with the rim 202 along the first bead seat 602 and the second bead seat 606 respectively. The first and second tire bead 610, 612 may be correspondingly spaced to define a substantially circular aperture through the tire 204 that has a radius substantially similar to the first radial distance 604 and the second radial distance 608 respectively. The first tire bead 610 may be coupled along the first bead seat 602 and the second tire bead 612 may be coupled along the second bead seat 606 to provide a substantially fluid-tight connection between the tire 204 and the rim 202.

Similarly, as shown in FIG. 6, the bladder 302 may define a first bladder bead 614 and a second bladder bead 616. The first bladder bead 614 and the second bladder bead 616 may define an annularly-shaped aperture in the bladder 302 having a radius defined by a third radial distance 618. The third radial distance 618 may be less than the first and second radial distances.

The rim 202 may also define a third bead seat 620 and a fourth bead seat 622. The third and fourth bead seats 620, 622 may be substantially cylindrical surfaces that are concentric with the rotation axis 208 and spaced by the third radial distance 618 from the rotation axis 208. The third and fourth bead seats 620, 622 may correspond with the first and second bladder beads 614, 616 respectively so that the first and second bladder beads 614, 616 may be coupled along the third and fourth bead seats 620, 622 to provide a substantially fluid-tight connection therebetween.

One embodiment may also have a first annular lip 624 disposed adjacent to, and extending radially away from, the first bead seat 602. Similarly, the rim member 404 may define a second annular lip 626 that is adjacent to, and extending radially away from, the second bead seat 606. The first and second annular lips 624, 626 may provide a contact location for the first tire bead 610 and the second tire bead 612, respectively, to ensure the proper axial alignment of the first and second tire beads 610, 612 along the rotation axis 208.

One embodiment may also have a third annular lip 628 disposed adjacent to, and extending radially away from, the third bead seat 620. Similarly, the rim member 404 may define a fourth annular lip 630 that is adjacent to, and extending radially away from, the fourth bead seat 622. The third and fourth annular lip 628, 630 may provide a contact location for the first bladder bead 614 and the second bladder bead 616 respectively, to ensure the proper axial alignment of the first and second bladder bead 614, 616 along the rotation axis 208.

In one non-exclusive embodiment, the first and second radial distances 604, 608 are substantially the same and the third radial distance 618 is less than the first and second radial distance 604, 608. In this embodiment, the bladder 302 may be coupled to the rim 202 and the rim member 404 at a radially inner portion (i.e. the third radial distance 618) of the rim 202 relative to the tire 204. Further, the bladder 302 may be coupled to the rim 202 at locations that are axially offset from the respective locations of the tire 204.

In one embodiment, the bladder 302 may be placed between the tire walls 504 prior to positioning the tire 204 and the bladder 302 around the rim 202. The first tire bead 610 may then be positioned on the first bead seat 602 until the first tire bead 610 at least partially contacts the first annular lip 624. The first bladder bead 614 may then be similarly pressed onto the third bead seat 620 until the first bladder bead 614 at least partially contacts the third annular lip 628.

Next, the rim member 404 may be aligned with the rim 202 and pressed onto the rim 202. As the rim member 404 is pressed onto the rim 202, second bladder bead 616 may be positioned on the fourth bead seat 622 until the second bladder bead 616 at least partially contacts the fourth annular lip 630. At substantially the same time, the second tire bead 612 may be positioned on the second bead seat 606 until the second tire bead 612 substantially contacts the second annular lip 626. Finally, the rim member 404 may be coupled to the rim 202 to provide a fluid-tight coupling between the tire 204, the bladder 302, and the rim 202. In one embodiment, an O-ring 634 may be disposed between the rim member 404 and the rim 202 to further seal the second interior region 508 of the bladder 302.

In an alternative embodiment that is considered herein, the first and second tire beads 610, 612 and the first and second bladder beads 614, 616 may substantially share the first and second bead seat 602, 606. In this embodiment, the first tire bead 610, the second tire bead 612, the first bladder bead 614, and the second bladder bead 616 are spaced the first radial distance 604 from the rotation axis 208. Further, there may not be the third bead seat 620 and the fourth bead seat 622. In this embodiment, the bladder 302 may be placed between the tire walls 504 before being slid over the rim 202. Then, the first tire bead 610 and the first bladder bead 614 may be positioned on the first bead seat 602 until the first tire bead 610 at least partially contacts the first annular lip 624 and the first bladder bead 614 is substantially adjacent to the first tire bead 610. The rim member 404 may then be positioned on the rim 202 so that the second tire bead 612 and the second bladder bead 616 become disposed along the second bead seat 606. The rim member 404 may be positioned on the rim until the second tire bead 612 at least partially contacts the second annular lip 626 and the second bladder bead 616 is substantially adjacent to the second tire bead 612. Finally, the rim member 404 may be coupled to the rim 202.

As described above, this disclosure is not limited to a rim that requires a rim member. When the tire 204 and the bladder 302 share the first and second bead seat 602, 606, the rim 202 may have the second bead seat 606 and the second annular lip 626 integrally formed therein. In this embodiment, the tire 204 and the bladder 302 may be coupled to the rim 202 by placing the bladder 302 between the tire walls 504 before stretching the tire 204 and bladder 302 over the first or second annular lip 624, 626. After the tire 204 and the bladder 302 are positioned between the first annular lip 624 and the second annular lip 626, the first tire bead 610 and the first bladder bead 614 may become disposed along the first bead seat 602. Then the second tire bead 612 and the second bladder bead 616 may become disposed along the second bead seat 606.

In yet a different embodiment, the bladder 302 may not require a bead seat or a bladder bead. In this embodiment, the bladder 302 may have a substantially circular cross-section and substantially encompass a toroidal cavity regardless of whether the bladder 302 is coupled to the tire 204. In this embodiment, the bladder 302 may have one valve (not shown) coupled thereto that allows the bladder 302- to be filled with a fluid and another valve (not shown) that allows the bladder to release fluid. Similarly, the valve for filling the bladder may be positioned through the rim 202 so that the bladder 302 may be filled with fluid even when it is positioned between the tire 204 and the rim 202. In one embodiment, the valve that releases fluid from the bladder may be selectively controlled electronically to release pressurized fluid from the bladder 302 into the cavity between the tire 204 and the rim 202.

Figure 7:
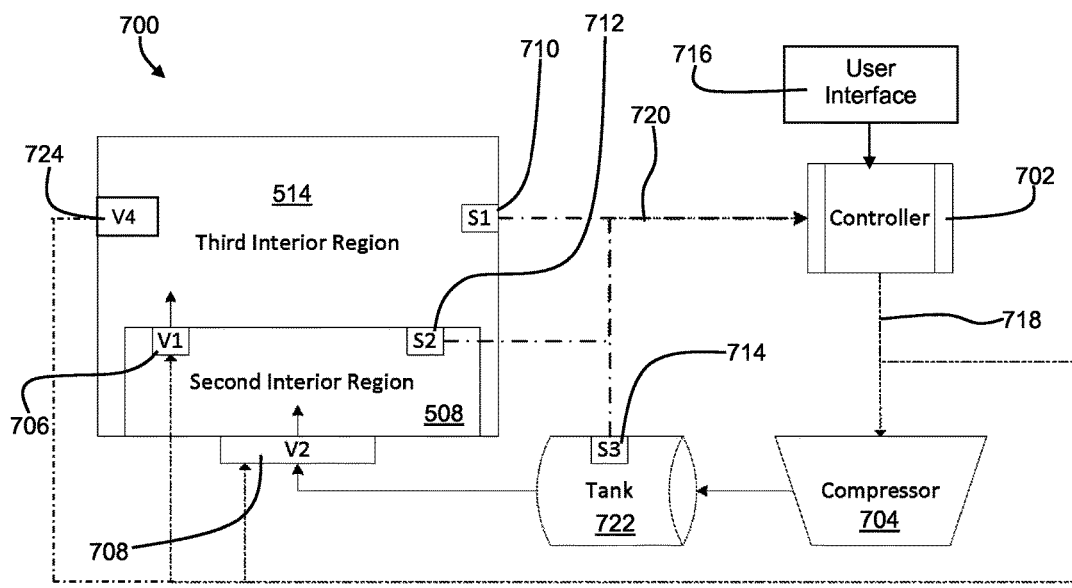
FIG. 7 is an illustrative control system diagram of one embodiment of the wheel assembly.

In FIG. 7, a control system 700 is shown. The control system 700 may have a controller 702 that is electrically coupled to a compressor 704, a first valve 706, a second valve 708, a third valve 724, a first sensor 710, a second sensor 712, and a third sensor 714. Further, the controller 702 is in communication with a user interface 716 that is capable of communicating a user-desired tire pressure to the controller 702. A first communication link 718 may transfer electrical signals from the controller 702 to the compressor 704, the first valve 706, the second valve 708, and the third valve 724. Similarly, a second communication link 720 may transfer electrical signals from the first, second, and third sensors 710, 712, 714 to the controller 702 indicating the pressure surrounding the sensors 710, 712, 714. The first and second communication links may transfer signals via any known wireless or wired technology.

In the system 700 of FIG. 7, the first valve 706 may have either a first position or a second position that is controlled by the controller 702. In the first position, the first valve 706 may fluidly isolate the second interior region 508 from the third interior region 514. In the second position, the first valve 706 may fluidly couple the second interior region 508 with the third interior region 514. In one non-limiting example, if the fluid in the second interior region 508 is at a higher pressure than the fluid in the third interior region 514, the first valve 706 may be transitioned to the second position to allow the pressurized fluid of the second interior region 508 to flow into and increase the fluid pressure of the third interior region 514. In other words, the fluid pressure in the second interior region 508 decreases while increasing the pressure in the third interior region 514.

Similarly, the second valve 708 may be positioned between a tank 722 and the second interior region 508. The tank 722 may accumulate compressed fluid supplied by the compressor 704. The second valve 708 may also have a first position and a second position. In the first position, the second valve 708 may fluidly isolate the second interior region 508 from the tank 722. However, when the second valve 708 is in the second position, the tank 722 may be fluidly coupled to the second interior region 508. When the second valve 708 is in the second position, a higher pressurized fluid may flow into the second interior region 508.

The third valve 724 may be positioned between the third interior region 514 and a surrounding atmosphere. The third valve 724 may also have a first position and a second position. In the first position, the third valve 724 may fluidly isolate the third interior region 514 from the atmosphere. However, when the third valve 724 is in the second position, the third interior region 514 may be fluidly coupled to the atmosphere. Accordingly, the pressurized fluid in the third interior region 514 may begin exhausting to the surrounding atmosphere.

While a tank 722 has been described as being coupled between the compressor 704 and the second valve 708, in one embodiment there is no tank 722. In this embodiment, the compressor 704 may be directly fluidly coupled to the second valve 708. In this embodiment, the second valve 708 is transitioned to the second position at substantially the same time that the compressor 704 is activated in order to properly supply compressed fluid to the second interior region 508.

In one embodiment, the first sensor 710 may be disposed in the third interior region 514, the second sensor 712 may be disposed in the second interior region 508, and the third sensor 714 may be disposed in the tank 722. Each of the respective sensors 710, 712, 714 may send a signal to the controller 702 via the second wire communication link 720 that is indicative of a detected pressure by the respective sensor.

In one embodiment, the user interface 716 may be manipulated by a user to communicate a desired fluid pressure in any one of the tank 722, the second interior region 508, or the third interior region 514 to the controller 702. In one example, the user may desire a maximum fluid pressure (or alternatively any desired fluid pressure) be provided in the tank 722. In this example, the user can manipulate the user interface 716 to communicate the desired maximum pressure condition in the tank 722. The controller 702 may then receive the current pressure signal from the third sensor 714 to determine the fluid pressure in the tank 722. If the tank 722 is not already at the maximum fluid pressure, the controller 702 sends a signal to the second valve 708 to ensure that the tank 722 is fluidly isolated from the second interior region 508. Then, the controller 702 sends a signal to activate the compressor 704 and provide compressed fluid to the tank 722. While the compressor 704 is activated, the controller 702 may continuously monitor pressure readings from the third sensor 714 until the maximum fluid pressure condition is met, at which point the controller 702 may deactivate the compressor 704.

In a second example, the user may desire the second interior region 508 be at a desired fluid pressure. In this example, the user may manipulate the user interface 716 to communicate this desired fluid pressure to the controller 702. The controller 702 can compare a pressure reading received from the second sensor 712 in the second interior region with a pressure reading of the third sensor 714 in the tank 722. If the pressure indicated by the third sensor 714 is greater than the pressure indicated by the second sensor 712, the controller 702 may transition the second valve 708 to the second position to fluidly couple the second interior region 508 with the tank 722. As the second interior region 508 is fluidly coupled with the tank 722, the controller 702 may continue to monitor the second sensor 712 until the desired fluid pressure is achieved. Once the desired fluid pressure in the second interior region 508 is achieved, the second valve 708 may be returned to its first position, thereby fluidly isolating the second interior region 508 from the tank 722. If the fluid pressure in the tank 722 is not high enough, the controller 702 may further activate the compressor 704 as described above.

In a third example, the user may desire the third interior region 514 be raised from a minimum pressure to a driving pressure. In this example, the user may manipulate the user interface 716 to communicate the need to fill the third interior region 514 to the driving pressure. The controller 702 may compare a pressure reading of the second sensor 712 in the second interior region 508 with a pressure reading of the first sensor 710 in the third interior region 514. If the pressure indicated by the second sensor 712 is greater than the pressure indicated by the first sensor 710, the controller 702 may transition the first valve 706 to the second position to fluidly couple the second interior region 508 with the third interior region 514. As the second interior region 508 is fluidly coupled with the third interior region 514, the controller 702 may continue to monitor the first sensor 710 until the driving fluid pressure is reached. Once the driving fluid pressure in the third interior region 514 is reached, the first valve 706 may be returned to the first position, thereby fluidly isolating the second interior region 508 from the third interior region 514.

Alternatively, in a fourth example the user may desire the third interior region 514 be lowered from the driving pressure to the minimum pressure. In this example the user may operate the user interface 716 to communicate this to the controller 702. The controller 702 may then take a pressure reading from the first sensor 710 to determine whether the current pressure in the third interior region 514 is greater than the minimum pressure. If it is, the controller 702 may control the third valve 724 to its second position to fluidly couple the third interior region 514 with the surrounding atmosphere, thereby exhausting fluid from the third interior region 514 and lowering the fluid pressure in the third interior region 514.

In yet another aspect of the system 700 of FIG. 7, the valves 706, 708 may be simultaneously opened to allow the compressor 704 to directly provide pressurized fluid to the second and third interior regions 508, 514. In this embodiment, when the third interior region requires a rise in pressure but the second interior region 508 and the tank 722 do not contain higher pressure fluid, the valves 706, 708 may both open as the compressor 704 is activated to provide pressurized fluid to the tank 722, the second interior region 508, and the third interior region 514 at substantially the same time.

While embodiments allowing the user to select pressure preferences in any of the tank 722, the second interior region 508, and the third interior region 514 have been described above, in one embodiment the user interface 716 may only allow for the user to select the pressure in the third interior region 514. In this embodiment, the controller 702 may monitor the second sensor 712 and the third sensor 714 to ensure they remain at a maximum pressure threshold. If any one of the tank 722 or the second interior region 508 falls below the maximum threshold, the controller 702 activates the compressor 704 and positions the second valve 708 in the position that corresponds with the area needing increased pressure.

In one non-exclusive embodiment, the first valve 706 may be a high-flow valve. In this embodiment, the high-flow first valve 706 is positionable to transfer the high pressure fluid from the second interior region 508 into the third interior region 514 in a substantially short period of time. The high-flow first valve 706 may allow the user to change the fluid pressure in the third interior region 514 from the minimum pressure to the driving pressure in a short period of time. Further, any of the valves described herein may incorporate a high-flow valve and this disclosure is not limited to any particular type of valve.

In yet another embodiment, the controller 702 may calculate an equilibrium pressure desired for the second interior region 508. The equilibrium pressure may be based on the current volume/pressure of the third interior region 514, the volume of the second interior region 508, and the driving pressure of the third interior region 514. The equilibrium pressure may be the fluid pressure required to be in the second interior region 508 in order to raise the current pressure of the third interior region 514 to the driving pressure.

In one non-limiting example, the third interior region 514 may be at about 10 PSI and have a volume of about 800 Liters. The second interior region 508 may have a volume of about 200 Liters. Further, the driving pressure of the third interior region may be about 15 PSI. In this example, the controller 702 calculates the equilibrium pressure to be the pressure required in the second interior region 508 that allows both the second and third interior regions 508, 514 to achieve the desired final pressure of 15 PSI when fluidly coupled to one another. This embodiment may allow substantially instantaneous release of the pressurized fluid from the second interior region 508 to the third interior region 514 without requiring the controller 702 to monitor the first sensor 710 during the release.

In one embodiment, the tire 204 that encompasses the third interior region 514 may contain a fluid pressure of about 0-60 PSI while the bladder 302 that encompasses the second interior region 508 may contain a fluid pressure at about 0-150 PSI. However, this disclosure is not limited to any particular pressure range. For example, in one embodiment the bladder 302 may contain fluid at pressures in excess of 3,000 PSI.

Further, the pressure capabilities of the bladder 302 may correlate with the bladder's 302 volume (i.e. the second interior region 508) compared to the volume of the third interior region 514. That is to say, if the bladder 302 has a small volume compared to the third interior region 514 (i.e., bladder volume is ¼ the volume of the third interior region), the bladder 302 may need to contain high fluid pressures to provide a significant change in the fluid pressure of the third interior region 514. Alternatively, if the bladder 302 defines a substantially similar volume as the third interior region 514, the bladder 302 may not need to contain high fluid pressures because of the comparatively similar volume.

Figure 8:
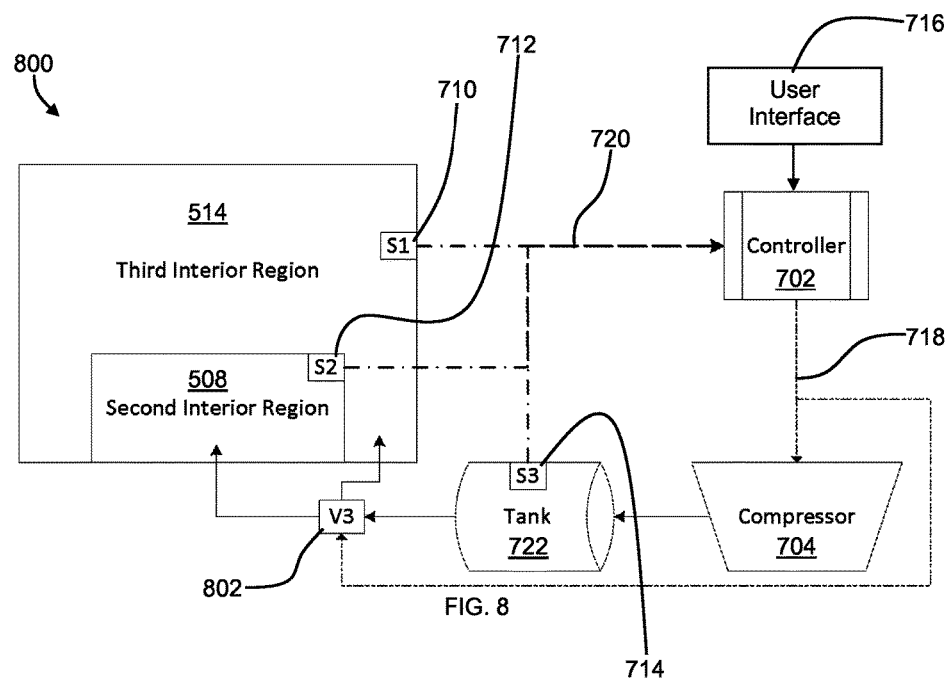
FIG. 8 is an illustrative control system diagram of a different embodiment of the wheel assembly.

In a different embodiment shown in a control system 800 in FIG. 8, a single valve 802 may be used for fluidly coupling the second interior region 508, the third interior region 514, the tank 722, and the atmosphere as described above for FIG. 7. Moreover, the valve 802 may pressurize the second interior region 508 and the third interior region (or main chamber) independently of one another. The valve 802 shown in FIG. 8 may have a first position, a second position, a third position, a fourth position, and a fifth position. In the first position, the valve 802 may substantially isolate (or fluidly decouple) the second interior region 508, the third interior region 514, the tank 722 and/or the compressor 704, and the surrounding atmosphere from one another. In the second position, the valve 802 may fluidly couple the second interior region 508 with the tank 722 and/or the compressor 704. In the third position, the valve 802 may fluidly couple the second interior region 508 with the third interior region 514. In the fourth position the valve 802 may fluidly couple the tank 722 and/or compressor 704 to the third interior region 514. Finally, in the fifth position, the valve may fluidly couple the third interior region 514 with the surrounding atmosphere to exhaust fluid pressure therefrom. Although not shown, the valve 802 or a second valve may further be in communication with the controller 702 to exhaust fluid pressure from the second interior region 508 to the surrounding atmosphere.

While several valve and sensor configurations have been disclosed herein, this disclosure is not limited to any particular one. The teachings of this disclosure are understood to be applicable in a plurality of configurations. For example, in one embodiment there may be no user interface 716. Rather, a sensor may indicate when the load condition of the tractor 100 has changed, and automatically adjust the fluid pressure in the third interior region 514 to accommodate the different load.

In yet another aspect of this disclosure, instead of monitoring the pressure of the third interior region 514, the deflection of the tire 204 may be monitored by a sensor instead. In this aspect, the sensor may be able to determine whether the fluid pressure in the third interior region 514 needs to be increased based on the deflection reading of the sensor. Accordingly, the second sensor 712 may be a deflection sensor that measures the deflection of the tire 204. In yet another embodiment, the fluid in the tank 722, the second interior region 508, and the third interior region 514 may be substantially nitrogen.

Figure 9:
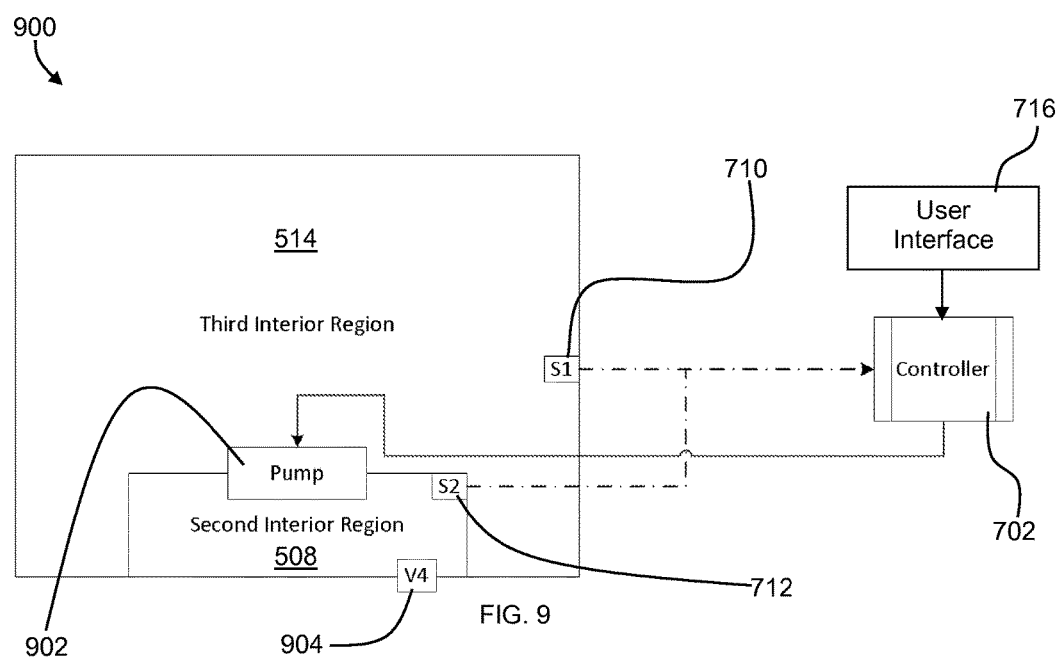
FIG. 9 is an illustrative control system diagram of a wheel assembly with a pump coupled thereto.

A different embodiment of the teachings disclosed herein is shown by the system 900 of FIG. 9. In the system 900 of FIG. 9, a pump 902 may be disposed between the second interior region 508 and the third interior region 514. In this embodiment, when the user desires a lower pressure condition in the third interior region 514, the pump 902 may force fluid located in the third interior region 514 into the second interior region 508. Similarly, when the user desires an increased fluid pressure in the third interior region 514, the pump 902 may transition fluid from the second interior region 508 into the third interior region 514.

The embodiment of FIG. 9 may have a valve 904 that allows fluid to be added to either the second interior region 508 or the third interior region 514. However, the embodiment of FIG. 9 may hot require either the second interior region 508 or the third interior region 514 be filled through the valve 904 at all. More specifically, the pump 902 may only transfer fluid between the second interior region 508 and the third interior region 514 rather than utilize fluid from an outside source. In this embodiment, the valve 904 may only be utilized if the wheel assembly 104 is leaking fluid out of the second or third interior region 508, 514.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A wheel assembly, comprising:
   a rim having a first outer radial surface;
   a rim member coupled to the rim and having a second outer radial surface;
   a tire coupled to the rim and the rim member to define a first interior region between the first and second outer radial surfaces and the tire;
   a bladder coupled to the rim to define a second interior region between the first outer radial surface and the bladder;
   a third interior region defined by the bladder, the first and second outer radial surfaces, and the tire;
   a first valve fluidly coupled to the second interior region and the third interior region, the first valve being movable between a first position and a second position;
   a rotation axis about which the rim rotates;
   a first bead seat formed by the rim and spaced from the axis by a first radial distance;
   a second bead seat formed by the rim member and spaced from the axis by a second radial distance and offset from the first bead seat in a direction parallel to the axis, the first radial distance and the second radial distance being approximately the same;
   a first tire bead and a second tire bead each formed by the tire; and
   a third bead seat formed by the rim and a fourth bead seat formed by the rim member;
   wherein, the bladder is disposed in the first interior region;
   further wherein, the second interior region and the third interior region are fluidly isolated from one another when the first valve is in the first position;
   further wherein, the second interior region and the third interior region are fluidly coupled to one another when the first valve is in the second position;
   further wherein, the first tire bead is in contact with the first bead seat and the second tire bead is in contact with the second bead seat;
   further wherein the rim member is removably couple to the rim;
   further wherein, the third bead seat and the fourth bead seat are spaced by a third radial distance from the axis, the third radial distance being less than the first and second radial distances;
   further wherein, the bladder defines a first bladder bead that is coupled to the rim along the third bead seat and a second bladder bead that is coupled to the rim along the fourth bead seat.

2. The wheel assembly of claim 1, wherein:
   the rim forms a first annular lip adjacent to the first bead seat; and
   rim member forms a second annular lip adjacent to the second bead seat.

3. The wheel assembly of claim 1, further comprising a second valve selectively coupling the second interior region to a compressor.

4. The wheel assembly of claim 1, wherein the first valve is coupled to the bladder between the second interior region and the third interior region.

5. A wheel assembly for a tractor, comprising:
   a tire having an inner diameter and an outer diameter, the tire adapted to rotate about an axis;
   a rim including a first outer radial surface;
   a rim member removably coupled to the rim, the rim member forming a second outer radial surface to which the inner diameter of the tire is in contact with, where the tire is coupled to the rim and the rim member to define a first internal cavity therebetween;
   a bladder disposed in the first internal cavity and coupled to the rim along the first outer radial surface, where a second internal cavity is defined between the rim and the bladder, and a third internal cavity is defined between the tire and the bladder;
   a first bead seat formed by the rim and spaced from the axis by a first radial distance;
   a second bead seat formed by the rim member and spaced from the axis by a second radial distance, the first radial distance and the second radial distance being approximately the same; and
   a first tire bead and a second tire bead each formed by the tire;
   a third bead seat formed by the rim and a fourth bead seat formed by the rim member, the third bead seat and the fourth bead seat being spaced by a third radial distance from the axis, the third radial distance being less than the first and second radial distances; and
   a valve fluidly coupled to the second and third internal cavities, the valve being movable between a first position where the second and third internal cavities are fluidly isolated from one another and a second position where the second and third internal cavities are fluidly coupled to one another;
   wherein the first tire bead is in contact with the first bead seat and the second tire bead is in contact with the second bead seat,
   further wherein, the bladder defines a first bladder bead that is coupled to the rim along the third bead seat and a second bladder bead that is coupled to the rim along the fourth bead seat.

6. The wheel assembly of claim 5, further comprising:
   a controller;
   a first sensor electrically coupled to the controller, the first sensor configured to determine a first pressure of the third internal cavity and transmit the first pressure to the controller; and
   a second sensor electrically coupled to the controller, the second sensor configured to determine a second pressure of the second internal cavity and transmit the second pressure to the controller.

7. The wheel assembly of claim 5, wherein the valve is coupled to the bladder between the second internal cavity and the third internal cavity.

8. The wheel assembly of claim 5, further comprising:
   a bladder outer radius defined between the axis and a radially outermost portion of the bladder; and
   a tire outer radius defined between the axis and a radially outermost portion of the tire;
   wherein the bladder outer radius is approximately 65% to 85% of the tire outer radius.

9. The wheel assembly of claim 5, further comprising a pressure source fluidly coupled to the valve for pressurizing at least one of the second and third internal cavities.

10. The wheel assembly of claim 9, wherein the valve is movable to a third position, a fourth position, and a fifth position;
    further wherein:
    in the third position, the pressure source is fluidly coupled only to the second internal cavity;

in the fourth position, the pressure source is fluidly coupled to the third internal cavity; and in the fifth position, the third internal cavity is fluidly coupled to a surrounding atmosphere.

\* \* \* \* \*